US011204715B1

(12) United States Patent
Fawcett et al.

(10) Patent No.: US 11,204,715 B1
(45) Date of Patent: Dec. 21, 2021

(54) DERIVED DATA GENERATION AND STORAGE

(71) Applicant: Amazon Technologies, Inc., Seattle, WA (US)

(72) Inventors: John Kenneth Fawcett, Lauder (GB); Timothy Lawrence Harris, Cambridge (GB); Lauren M Kisser, Cambridge (GB); Didier Wenzek, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/141,743

(22) Filed: Sep. 25, 2018

(51) Int. Cl.
*G06F 3/06* (2006.01)
(52) U.S. Cl.
CPC ............ *G06F 3/0659* (2013.01); *G06F 3/067* (2013.01); *G06F 3/0617* (2013.01)
(58) Field of Classification Search
CPC ....... G06F 3/0659; G06F 3/0617; G06F 3/067
See application file for complete search history.

(56) References Cited

U.S. PATENT DOCUMENTS

| | | | | |
|---|---|---|---|---|
| 7,640,496 | B1 * | 12/2009 | Chaulk | G06F 3/067 715/243 |
| 8,019,200 | B2 * | 9/2011 | Ong | G11B 27/034 386/279 |
| 8,588,578 | B2 * | 11/2013 | Gasper | H04N 21/4126 386/239 |
| 9,330,143 | B2 * | 5/2016 | Obukhov | G06F 16/24561 |
| 9,665,479 | B2 * | 5/2017 | Gao | G06F 3/0689 |
| 9,792,179 | B1 * | 10/2017 | Lazier | G06F 11/1076 |
| 9,875,183 | B2 * | 1/2018 | Czerkowicz | G06F 12/08 |
| 9,916,097 | B1 * | 3/2018 | Martin | G06F 3/061 |
| 2002/0093856 | A1 * | 7/2002 | Baentsch | G06F 9/44589 365/200 |
| 2006/0053169 | A1 * | 3/2006 | Straub | G06F 16/951 |
| 2007/0083743 | A1 * | 4/2007 | Tsang | G06F 9/4418 713/1 |
| 2007/0226238 | A1 * | 9/2007 | Kiilerich | G11B 27/10 |
| 2009/0232349 | A1 * | 9/2009 | Moses | G06T 5/006 382/100 |
| 2016/0306554 | A1 * | 10/2016 | Li | G06F 3/0653 |
| 2017/0329552 | A1 * | 11/2017 | Baldwin | G06F 3/0605 |
| 2018/0336189 | A1 * | 11/2018 | Sial | G06F 40/58 |

OTHER PUBLICATIONS

GitHub; "Caches Explained;" Aug. 2, 2015; available at: https://web.archive.org/web/20150802211059/https://github.com/google/guava/wiki/CachesExplained.*

(Continued)

*Primary Examiner* — Prasith Thammavong
*Assistant Examiner* — Richard L Sutton
(74) *Attorney, Agent, or Firm* — Davis Wright Tremaine LLP

(57) ABSTRACT

A data storage service obtains derivation code and data. The derivation code is executable to generate derived data from the data. The data storage service stores the derivation code and the data in a logical data container. In response to receiving a request to obtain the derived data, the data storage service uses the derivation code to regenerate the derived data from the data and transmits the derived data to fulfill the request.

23 Claims, 7 Drawing Sheets

(56) References Cited

OTHER PUBLICATIONS

NetApp Support; "How inline deduplication works;" Feb. 2016; available at: https://library.netapp.com/ecmdocs/ECMLP2348026/html/GUID-C0EEE74B-052A-4694-8202-D14441D471A8.html.*

GitHub; "Caches Explained;" Aug. 2, 2015; available at: https://web.archive.org/web/20150802211059/https://github.com/google/guava/wiki/CachesExplained (Year: 2015).*

NetApp Support; "How inline deduplication works;" Feb. 2016; available at: https://library.netapp.com/ecmdocs/ECMLP2348026/html/GUID-C0EEE74B-052A-4694-8202-D14441D471A8.html (Year: 2016).*

* cited by examiner

DERIVED DATA GENERATION AND STORAGE

BACKGROUND

The use of remote and network-based storage services, such as object-based data storage services, has proliferated in recent years. Object-based data storage services enable users ranging from large organizations to individuals to utilize storage resources provided by these services for retaining and managing their data. With object-based data storage services, users may forego the initial setup costs associated with purchasing storage equipment, such as hard drives, solid state drives, and the like. Instead, users may leverage readily available storage resources of a service provider at a fraction of the cost associated with establishing dedicated storage for their data. As users access their data over time, they may generate derived data that may be stored along with their other data in these storage resources. However, storage of this derived data can result in inefficiencies that can result in added costs to these users, as additional storage resources may be required to store new derived data as it is generated, at least partially negating any cost benefit that may be had by using these storage services.

BRIEF DESCRIPTION OF THE DRAWINGS

Various techniques will be described with reference to the drawings, in which.

DETAILED DESCRIPTION

Figure 1:
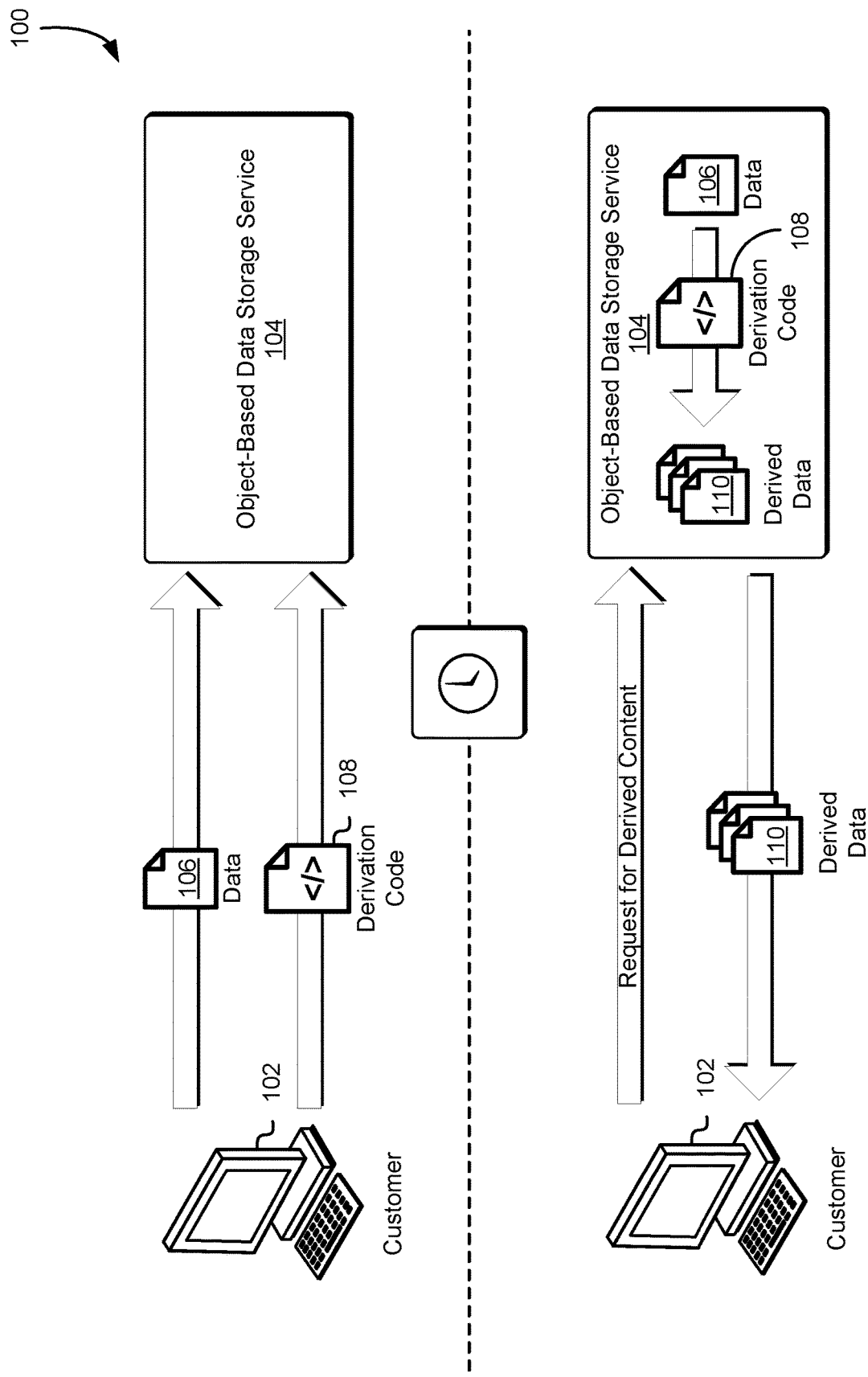
FIG. 1 shows an illustrative example of a system in which various embodiments can be implemented.

Techniques described and suggested herein relate to the storage and use of a mechanism (e.g., source code, compiled code, executable files, etc.) by which derived data can be generated in response to requests to obtain the derived data. In an example, a customer of an object-based data storage service stores, within a logical data container, data usable as input for creating derived data. The data may include metrics and/or statistical data, spreadsheets, database files, image files, and the like. In addition to this data, the customer of the object-based data storage service may store, within the logical data container, the derivation code by which derived data can be generated. For instance, the customer may store source code that, when executed, utilizes the data stored in the logical data container as input to generate the derived data. The customer may transmit a request to the object-based data storage service to execute the derivation code and generate the derivate content, which may be provided to the customer once obtained.

In an example, the object-based data storage service evaluates the derivation code by which the derived data is generated to determine whether execution of the derivation code would result, consistently, in the same derived data being generated. For instance, the object-based data storage service may evaluate the data usable as input to the derivation code to determine whether any of the data includes variables that may have changing values (e.g., date/time entries, current system conditions, etc.). If any of the data includes variables that have changing values over time, the object-based data storage service may determine that the derived data generated through use of the derivation code may also differ in accordance with these changing values. Thus, the object-based data storage service may store derived data generated using such a derivation code within the logical data container of the customer. However, if the data does not change over time (e.g., constant, fixed, etc.) and the derivation code does not require state information that may change over time, the object-based data storage service may determine that the derived data generated through use of the derivation code is identical for each execution of the derivation code.

In an example, if the object-based data storage service determines that the derived data generated using the derivation code stored in the logical data container would be identical regardless of time of execution of the derivation code, the object-based data storage service determines that storage of the derived data within the logical data container need not be persistent. For instance, if a customer of the object-based data storage service submits a request to obtain the derived data, the object-based data storage service may execute the derivation code to generate the derived data. The object-based data storage service may provide the derived data to fulfill the request and may store the derived data in a cache to save on additional compute processes should the customer submit a later request to obtain the derived data. In an example, the derived data is stored in the cache for a limited time. The object-based data storage service may determine this period of time based on the customer's data storage budget, statistics of the cost to re-compute the derived data versus the cost of storage to the customer, and the like. In an example, if the time period for storage of the derived data in the cache has expired, the object-based data storage service may remove the derived data from the cache. Thus, if the customer submits a new request to obtain the derived data, the object-based data storage service may re-execute the derivation code to obtain the derived data.

In an example, rather than removing the derived data from the cache, the object-based data storage service can automatically transition the derived data from the data storage tier of the logical data container to other data storage tiers and/or to the archival data storage service based on usage data for the derived data. For instance, the object-based data storage service may monitor access to the derived data over time to determine whether the access patterns for the derived data is consistent with the data storage tier the derived data is placed in. For example, if the object-based data storage service determines that the derived data is being used infrequently, the object-based data storage service may transition the derived data from a standard data storage tier to an infrequent access data storage tier. This infrequent access data storage tier may include logical data containers that enable long-term storage of data objects at a reduced cost. However, users may incur a fee each time the user accesses a data object from a logical data container in the infrequent access data storage tier. Thus, based on usage data for derived data in the infrequent access data storage tier, if there is an increase in the frequency of use for the derived data, the object-based data storage service may transition the derived data to the standard data storage tier to enable access to the data object without incurring a fee to access the data object. In an example, if a customer requests immediate access to the derived data, the object-based data storage service can execute the derivation code to generate the derived data while maintaining the previously generated derived data in a logical data container corresponding to its current data storage tier. The object-based data storage service may provide the newly generated derived data to the customer. Further, the object-based data storage service may remove the newly generated derived data and continue to store the previously generated derived data in its current data storage tier.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages. For example, because the object-based data storage service removes the derived data from a cache after a limited period of time, the customer may save on data storage costs as the derived data is not stored in the logical data container along with the data and derivation code used to generate the derived data. Similarly, the customer may save on data storage costs if the derived data is automatically transitioned to other data storage tiers based on the frequency of access and use of the derived data. Also, because the object-based data storage service evaluates the derivation code used to generate the derived data to determine whether the derived data is identical for each execution of the derivation code, the object-based data storage service may guarantee, to the customer, that removal of the derived data from the logical data container will not have a detrimental impact on the customer's ability to obtain the derived data, as the object-based data storage service may use the derivation code to re-generate the derived data on demand.

FIG. 1 shows an illustrative example of a system 100 in which various embodiments can be implemented. In the system 100, a customer 102 of an object-based data storage service 104 submits a request to store data 106 and derivation code 108 in a logical data container. The object-based data storage service 104 may be a service provided by a computing resource service provider. The data 106 and the derivation code 108 may be provided by the customer 102 at different times. For instance, the customer 102 may initially provide the data 106 for storage in a logical data container. At a later time, the customer 102 may provide the derivation code 108 for storage in the logical data container. Alternatively, the customer 102 may provide the derivation code 108 initially and, at a later time, provide the data 106. As another example, the customer 102 may provide both the data 106 and the derivation code 108 in a single request for storage of the data 106 and derivation code 108.

The object-based data storage service 104 may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein. The data stored in the object-based data storage service 104 may be organized into data objects. The data objects may have arbitrary sizes and may, in some instances, have constraints on size. Thus, the object-based data storage service 104 may store numerous data objects of varying sizes. The object-based data storage service 104 may operate as a key value store that associates data objects with identifiers of the data objects which may be used by the customer 102 to retrieve or perform other operations in connection with the data objects stored by the object-based data storage service 104. Access to the object-based data storage service 104 may be through application programming interface (API) calls to the service or via an interface, such as a graphical user interface (GUI). While an object-based data storage service 104 is utilized extensively throughout the present disclosure for the purpose of illustration, other data storage services may be utilized, along with corresponding data storage devices. For example, the embodiments and features described herein may be implemented on a block-level data storage service, an archival data storage service, and the like.

In an embodiment, storage of the data 106 and the derivation code 108 in a logical data container provided by the object-based data storage service 104 may result in a cost to the customer 102. The object-based data storage service 104 may provide different data storage tiers for different data object use cases. These different data storage tiers may provide benefits to the customer 102 and other users based at least in part on the usage of data objects classified accordingly. For example, the object-based data storage service 104 may provide a standard data storage tier, which can be utilized to classify data objects that are to be accessed frequently by the customer 102 and other users (e.g., data utilized for dynamic websites, content distribution, mobile and gaming applications, analytics, etc.). Data objects classified as being in the standard data storage tier may be stored on computer systems that enable rapid availability with minimal latency. Thus, in some instances, the object-based data storage service 104 may provide cost savings to the customer 102 by enabling frequently used data objects classified as being in the standard data storage tier to be accessed without incurrence of a fee per data access. The object-based data storage service 104 may also provide an infrequent access data storage tier, which may be utilized to classify data objects that are accessed at a lesser frequency than other data objects classified as being in the standard data storage tier.

The derivation code 108 may include a set of programmatic instructions that, if executed by one or more processors of a computer system, cause the computer system to generate derived data 110. The derivation code 108 may include source code, compiled programmatic code, a configuration for workflow processing frameworks, an executable file, and the like. Execution of the derivation code 108 may result in use of the data 106 as input to generate derived data 110. The data 106 may include metrics and/or statistical data, spreadsheets, database files, image files, audio files, video files, and the like. The derived data 110 may include transcoded videos, transcoded images, transcoded audio files, trained neural networks, statistical analyses and summaries, machine translations, and the like. The data 106 utilized as input to the derivation code 108 may require more storage capacity than the derivation code 108, as the data 106 may include the information utilized by the derivation code 108 to generate the derived data 110. Thus, the derived data 110 may also require more storage capacity than the derivation code 108 within the logical data container.

In an embodiment, the object-based data storage service 104 evaluates the derivation code 108 provided by the customer 102 to determine whether execution of the derivation code 108 results in different derived data 110 being generated for each execution of the derivation code 108. For instance, the object-based data storage service 104 may evaluate the derivation code 108 to identify any programmatic instructions that require a variable input, such as the current system time/date, current system metrics data, and the like. Derivation code 108 that requires variable input may result in creation of derived data 110 that may differ based on any number of variables, resulting in derived data 110 that may not be consistent for each execution of the derivation code 108. In an embodiment, if the object-based data storage service 104 determines that execution of the derivation code 108 would result in creation of derived data 110 with variable output (e.g., the derived data 110 would be different for each execution of the derivation code 108), the object-based data storage service 104 may store the derived data 110 generated through execution of the derivation code 108 in the logical data container with the data 106 and the derivation code 108.

In an embodiment, if the object-based data storage service 104 determines that execution of the derivation code 108 would result in the same derived data 110 being generated (e.g., the derived data 110 does not include variable output), the object-based data storage service 104 may determine that the derived data 110 may be stored within a cache to enable repeated access to the derived data 110. The derived data 110 may be stored within a cache for a limited period of time. This period of time may be determined based on a customer's budget for storage of data within the object-based data storage service 104, statistics related to the cost to recreate the derived data 110 versus the cost to store the derived data 110 within the cache, and the like. Information specifying this period of time for storage of the derived data 110 within a cache may be indicated in the customer's account. Thus, if derived data 110 is stored within a cache, the object-based data storage service 104 may evaluate the customer's account to identify the period of time that the derived data 110 may be stored in the cache and specify, in metadata for the derived data 110, this period of time.

In an embodiment, the customer 102, after a period of time since storage of the data 106 and the derivation code 108 within its logical data container maintained by the object-based data storage service 104, submits a request to the object-based data storage service 104 to obtain the derived data 110. The request may specify an identifier corresponding to the derivation code 108 and an identifier corresponding to the data 106 to be utilized as input to the derivation code 108 to generate the derived data 110. In an embodiment, the object-based data storage service 104 maintains an association between the derivation code 108 and the data 106 usable as input to the derivation code 108 to generate the derived data 110. For instance, the object-based data storage service may maintain a database that includes an entry corresponding to the derivation code 108 and, within the entry, identifiers corresponding to the data 106 usable as input to the derivation code 108. The entry may specify, for each derivation code 108 and data 106 pairing, whether the derived data 110 generated through execution of the derivation code 108 results in a consistent or variable output. Within the database, the object-based data storage service 104 may generate a unique identifier for each possible set of derived data 110 that may be generated through execution of the derivation code 108. For instance, for each pairing of derivation code 108 and data 106 usable as input, the object-based data storage service 104 may generate a unique identifier for the resulting derived data 110. The object-based data storage service 104 may provide these unique identifiers corresponding to possible derived data 110 to the customer 102. Thus, the customer 102 may submit a request to obtain the derived data 110, where the request specifies a unique identifier corresponding to the derived data 110. This may cause the object-based data storage service 104 to utilize the database to identify the derivation code 108 and the data 106 usable to generate the requested derived data.

In response to the request from the customer 102, the object-based data storage service 104 executed the derivation code 108, using the data 106 as input, to generate the derived data 110. The object-based data storage service 104 may provide the derived data 110 to the customer 102 to fulfill the request. In an embodiment, if the object-based data storage service 104 has previously determined that the derived data 110 is consistent for each execution of the derivation code 108, the object-based data storage service 104 stores the derived data in a cache in accordance with a set of storage parameters (e.g., customer's budget for storage of data, statistics of cost to recreate the derived data 110 versus the cost to store in the cache over time, etc.). Through use of the set of storage parameters, the object-based data storage service 104 determines the expiration time (e.g., duration for storage in the cache) for the derived data 110 in the cache. For instance, if the derived data 110 is not accessed for a period of time that exceeds the expiration time, the object-based data storage service 104 may remove the derived data 110 from the cache. In some instances, requests to access the derived data 110 may reset the expiration time for storage of the derived data 110 within the cache. For example, if the customer 102 submits a request to obtain the derived data 110, the object-based data storage service 104 may obtain the derived data 110 from the cache instead of regenerating the derived data 110 through execution of the derivation code 108. Further, the object-based data storage service 104 may reset the expiration time for the derived data 110. Alternatively, the expiration time may be fixed, resulting in removal of the derived data 110 from the cache once the expiration time has elapsed regardless of whether the customer 102 has requested access to the derived data 110.

If the derived data 110 is no longer stored in the cache (e.g., the derived data 110 has expired), and the object-based data storage service 104 receives a request from the customer 102 to obtain the derived data 110, the object-based data storage service 104 may execute the derivation code 108 to regenerate the derived data 110. The object-based data storage service 104 may provide the derived data 110 to the customer 102 to fulfill the request. Further, the object-based data storage service 104 may store the newly created derived data 110 within the cache, subject to a new expiration time, whereby the new expiration time may be determined based on the factors described above. Thus, storage of derived data 110 generated through use of the derivation code 108 and guaranteed to be identical for each execution of the derivation code 108 may be stored within the cache for a limited period of time, thereby minimizing the storage costs to the customer 102 for the derived data 110.

In an embodiment, the derived data 110 is initially stored in a logical data container corresponding to a particular data storage tier. A logical data container is a logical unit of storage maintained by the object-based data storage service 104 and may correspond to a unit of storage of a computer system, such as a portion of a physical hard drive, solid state drive, memory (e.g., flash memory, random access memory (RAM), etc.), a removable drive (e.g., Universal Serial Bus (USB) flash memory drives, floppy disks, external hard drives, etc.), and the like. Each logical data container may include metadata, which may specify the classification of the logical data container (e.g., which data storage tier it is a part of, etc.) and the data objects stored therein. The derived data 110 may be stored in a logical data container that also includes the derivation code 108 and data 106 for generation of the derived data 110. Alternatively, the customer 102 may indicate, in its request to store the derivation code 108 and the data 106, that derived data 110 is to be stored within a logical data container of a particular data storage tier.

In an embodiment, the object-based data storage service 104 monitors the derived data 110 to determine an optimal placement of the derived data 110 over time to reduce the storage costs for the customer 102. For instance, usage of the derived data 110 may be recorded in a data log, which may specify the time at which the derived data 110 was accessed and the duration of such access. The object-based data storage service 104 may evaluate this data log to identify a frequency over time that the derived data 110 is utilized by the customer 102 and other authorized users. In some instances, the object-based data storage service 104 may compare this usage frequency of the derived data 110 to the usage frequency of other data objects classified as being in the same data storage tier. If the usage frequency of the derived data 110 is lower than the average usage frequency for other data objects classified as being in the same data storage tier, the object-based data storage service 104 may transition the derived data 110 to a logical data container corresponding to another data storage tier. For example, if the derived data 110 is classified as being in the standard data storage tier, the object-based data storage service 104 may transfer the derived data 110 to a logical data container classified as being in the infrequent access data storage tier or to an archival data storage service.

In an embodiment, if the object-based data storage service 104 determines, based at least in part on usage data for the derived data 110 and a predicted cost assessment for storage and use of the derived data 110, that the derived data 110 is to be stored in the archival data storage service, the object-based data storage service 104 transmits a request to the archival data storage service to store the derived data 110. In response to the request, the archival data storage service may store the derived data 110 in an archive classified, through metadata, as being in an archival data storage tier. In an embodiment, usage data for the derived data 110 is provided by the archival data storage service to the object-based data storage service 104, which may utilize this information to determine the optimal storage location for the derived data 110.

The archival data storage service may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein. The archival data storage service may provide storage for data archiving and backup of customer data, such as the derived data 110. The archival data storage service may thus persistently store data that may be infrequently accessed and for which long retrieval times are acceptable to a customer 102 utilizing the service. A customer 102 or the object-based data storage service 104 may interact with the archival data storage service to generate one or more archives. Each archive may represent one or more data files that may be combined to form the archive. Accordingly, a customer 102 or the object-based data storage service 104, through API calls to the service, may upload and retrieve archives from the archival data storage service and monitor the retrieval of these archives, as each retrieval job may typically require several hours to complete.

Storage of the derived data 110 in the infrequent access data storage tier or in an archival data storage service, as described above, may require additional time for the customer 102 to retrieve the derived data 110. As such, the customer 102 may submit a request to the object-based data storage service 104 to regenerate the derived data 110 using the derivation code 108 and the data 106 if the derived data 110 is required by the customer 102 immediately. In response to the request, the object-based data storage service 104 may execute the derivation code 108, using the data 106 as input, to regenerate the derived data 110. The object-based data storage service 104 may provide the derived data 110 to the customer 102 to fulfill the request. Further, since the regenerated derived data 110 is identical to the derived data stored either in the infrequent access data storage tier or in the archival data storage service, the object-based data storage service 104 may remove the regenerated derived data 110 to provide cost savings to the customer 102 for storage of the derived data 110. In an embodiment, the object-based data storage service 104 updates the usage data for the derived data 110 to indicate that the derived data 110 was regenerated by the object-based data storage service 104 due to the urgency of a customer's request to obtain the derived data 110. This updated usage data may be utilized by the object-based data storage service 104 to determine whether transition of the derived data 110 is required (e.g., a new optimal data storage tier for the derived data 110 is identified). If so, the object-based data storage service 104 may transition the derived data 110 to a logical data container corresponding to the optimal data storage tier for the derived data 110.

Figure 2:
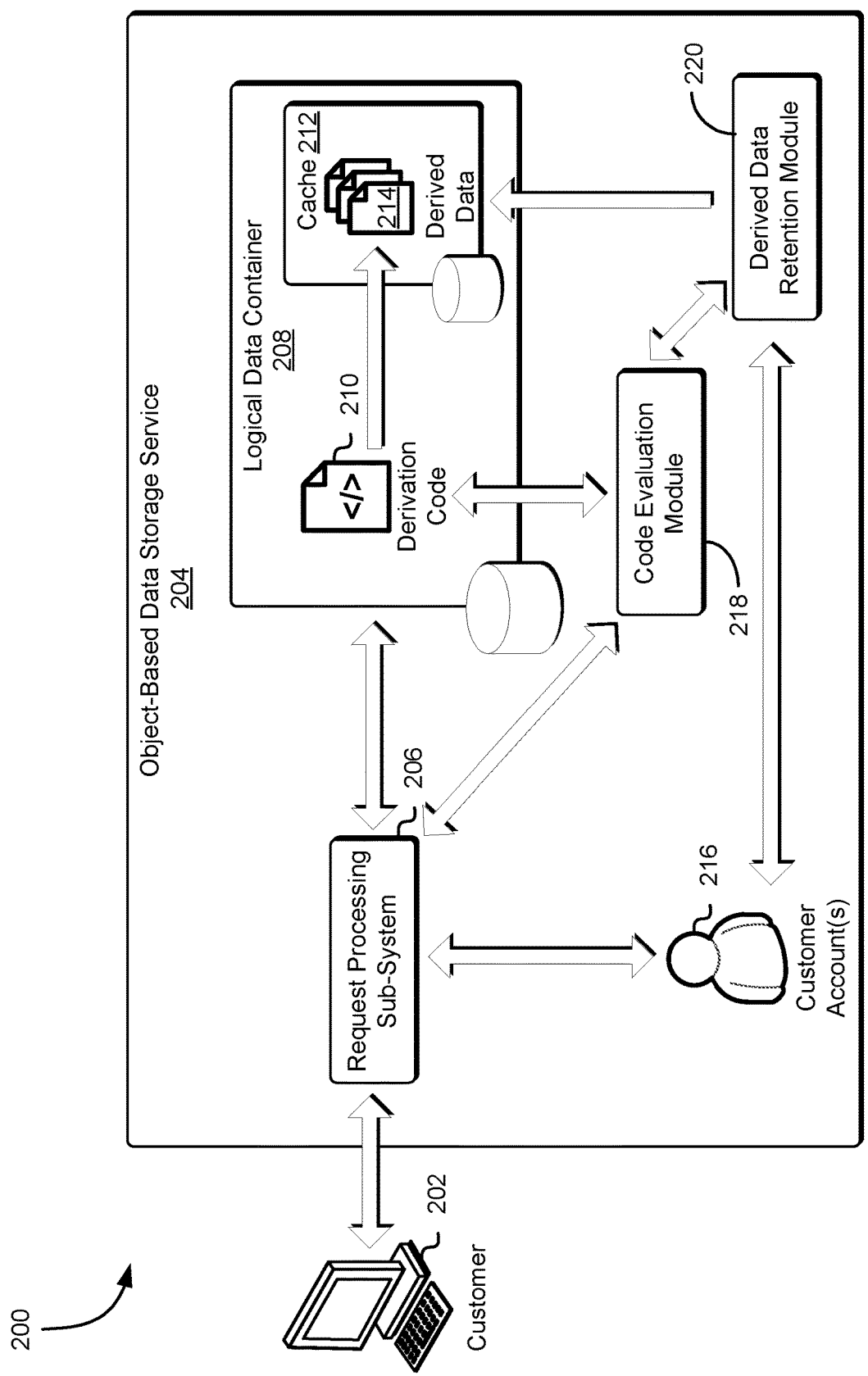
FIG. 2 shows an illustrative example of a system in which derived data is generated on demand using derivation code within a logical data container in accordance with at least one embodiment.

As noted above, a customer of an object-based data storage service may provide, to the object-based data storage service, derivation code and data usable as input to the derivation code to generate derived data. The derivation code and data may be stored in a logical data container of the object-based data storage service. Derived data generated through execution of the derivation code may be stored in cache temporarily based on a set of storage parameters for the derived data. Thus, after an expiration time has elapsed for the derived data, the derived data is removed from the cache, reducing the cost to store the derived data. Accordingly, FIG. 2 shows an illustrative example of a system 200 in which derived data 214 is generated on demand using derivation code 210 within a logical data container 208 in accordance with at least one embodiment.

In the system 200, a customer 202 submits a request to the object-based data storage service 204 to store a derivation code 210 and data usable as input to the derivation code 210 within a logical data container 208 of the customer 202. The request may specify an identifier corresponding to the logical data container 208 in which the derivation code 210 and the data is to be stored. Alternatively, the request may specify that a logical data container 208 is to be provisioned for storage of the derivation code 210 and the data. For instance, the customer 202 may specify, in its request to the object-based data storage service 204, that it wishes to provision a logical data container 208 within a particular data storage tier. In an embodiment, the object-based data storage service 204 includes a request processing sub-system 206 that processes incoming requests from the customer 202 to interact with the object-based data storage service 204. The request processing sub-system 206 is implemented on one or more computer systems of the object-based data storage service 204 using hardware and software and may be executed using executable instructions whose execution by the one or more computer systems causes the request processing sub-system 206 to perform the operations described herein.

In response to the request from the customer 202, the request processing sub-system 206 stores the derivation code 210 and the data usable as input to the derivation code 210 in a logical data container 208 of the object-based data storage service 204. In an embodiment, the request processing sub-system 206 transmits a request to a code evaluation module 218 to evaluate the derivation code 210 stored in the logical data container 208 to determine whether execution of the derivation code 210 results in identical derived data being generated each time the derivation code 210 is executed. The code evaluation module 218 is implemented on one or more computer systems of the object-based data storage service 204 using hardware and software and may be executed using executable instructions whose execution by the one or more computer systems causes the code evaluation module 218 to perform the operations described herein. The code evaluation module 218 may evaluate the derivation code 210 to determine whether the derivation code 210 includes executable instructions that require, as input, inputs that may change over time (e.g., system date/time, system metrics collected over time, usage data collected over time, etc.). In an embodiment, the code evaluation module 218 determines, during an execution of the derivation code 210, whether one or more processors executing the derivation code 210 are accepting inputs outside of the data provided by the customer 202. For instance, the code evaluation module 218 may monitor execution of the derivation code 210 to determine whether the one or more processors are obtaining inputs that may change over time, inputs related to environmental measurements (e.g., settings of a computing device or of the object-based data storage service 204, etc.) and the like.

If the code evaluation module 218 determines that the derivation code 210 requires inputs that may change over time or that include environmental measurements, resulting in variable derived data, the code evaluation module 218 may determine that the derived data generated via execution of the derivation code 210 may need to be stored within the logical data container 208 in order to make this derived data available to the customer 202 at any time. The code evaluation module 218 may update the customer account 216 associated with the customer 202 to indicate that the derivation code 210 generates variable output, thus necessitating storage of derived data generated using the derivation code 210 within the logical data container 208. Thus, in response to a request from the customer 202 to obtain the derived data generated through execution of the derivation code 210, the request processing sub-system 206 may evaluate the customer profile 216 of the customer 202 to determine that execution of the derivation code 210 is required. Further, the request processing sub-system 206 may execute the derivation code 210 to generate the derived data. The request processing sub-system 206 may provide the derived data to the customer 202 to fulfill the request. Additionally, the request processing sub-system 206 may store the derived data within the logical data container 208 to enable the customer 202 to obtain the derived data at any time. The derived data generated in this manner may be subject to transitioning to logical data containers of other data storage tiers based on a frequency of usage of the derived data.

In an embodiment, if the code evaluation module 218 determines that the derivation code 210 produces identical derived data regardless of when the derivation code 210 is executed, the code evaluation module 218 transmits an indication to a derived data retention module 220 that derived data 214 generated via execution of the derivation code 210 is to be stored in a cache 212 of the logical data container 208. The derived data retention module 220 is implemented on one or more computer systems of the object-based data storage service 204 using hardware and software and may be executed using executable instructions whose execution by the one or more computer systems causes the derived data retention module 220 to perform the operations described herein. The code evaluation module 218 may also update the customer account 216 of the customer 202 to indicate that execution of the derivation code 210 results in identical derived data 214 being generated, regardless of when the derivation code 210 is executed by the request processing sub-system 206 on behalf of the customer 202.

In an embodiment, the customer 202 submits a request to the object-based data storage service 204 to obtain derived data 214 generated via execution of the derivation code 210. The request may specify an identifier of the derivation code 210 and an identifier corresponding to the data to be utilized as input to the derivation code 210 to obtain the derived data 214. Alternatively, the request may specify an identifier corresponding to the derived data 214. This identifier may be provided to the customer 202 by the request processing sub-system 206 in response to the customer 202 providing the derivation code 210 and the data. For example, in an embodiment, if the code evaluation module 218 determines that execution of the derivation code 210 results in identical derived data 214 being generated, the code evaluation module 218 may assign an identifier to the derived data 214 that may be generated through execution of the derivation code 210. The code evaluation module 218, through the request processing sub-system 206, may provide this identifier to the customer 202 to enable the customer 202 to request, using the identifier, access to the derived data 214.

In response to the request from the customer 202, the request processing sub-system 206 may determine whether the derived data 214 is stored within the cache 212 of the logical data container 208. If the requested derived data 214 is stored within the cache 212, the request processing sub-system 206 may provide the derived data 214 to fulfill the request. However, if the request processing sub-system 206 determines that the derived data 214 is not stored within the cache 212, the request processing sub-system 206 may execute the derivation code 210 to generate the derived data 214. In an embodiment, if execution of the derivation code 210 results in identical derived data being generated for each execution of the derivation code 210, the request processing sub-system 206 stores the derived data 214 in the cache 212. The request processing sub-system 206 may evaluate the customer account 216 of the customer 202 to determine that the derived data 214 generated through execution of the derivation code 210 would be identical if generated at a later time or in response to a later request to obtain the derived data 214.

In an embodiment, the request processing sub-system 206 may transmit an indication to the derived data retention module 220 that the derived data 214 is to be stored in the cache 212. The derived data retention module 220 may access the customer account 216 of the customer 202 to identify a set of storage parameters usable to determine a retention period for storing the derived data 214 in the cache 212. For instance, the derived data retention module 220 may determine, from the customer account 216, the customer's data storage budget, statistics of the cost to re-compute the derived data versus the cost of storage to the customer 202, and the like. Based on these storage parameters for the derived data 214, the derived data retention module 220 may determine a retention period for the derived data 214. The derived data retention module 220 may generate metadata for the derived data 214, whereby the metadata may specify the retention period for the derived data 214.

In an embodiment, the set of storage parameters are usable to determine a threshold for storage of the derived data 214 in the cache 212 whereby the derived data 214 is removed from the cache 212 if the threshold is met. This threshold may be the retention period specified above, whereby if the retention period for the derived data 214 in the cache 212 has elapsed, the derived data retention module 220 may remove the derived data 214 from the cache 212. In an embodiment, the threshold is based on a size limit for the cache 212. For instance, if the derived data retention module 220 determines that the customer 202 has met or has otherwise exceeded a size limit for storage of data of the customer 202 in the cache 212, the derived data retention module 220 may remove the derived data 214 from the cache 212 to allocate storage capacity within the cache 212 to more contemporaneous data of the customer 202. Alternatively, as the storage capacity of the cache 212 is utilized for storage of data provided by the customer 202 or otherwise generated in a manner other than through execution of derivation code 210, the available storage capacity for derived data 214 may decrease. Thus, if the size of the derived data 214 is greater than the available storage capacity in the cache 212 allocated for derived data 214, the derived data retention module 220 may remove the derived data 214 from the cache 212.

In an embodiment, the derived data retention module 220 monitors the cache 212 to identify any derived data that has expired. For instance, the derived data retention module 220 may evaluate the metadata for each derived data stored within the cache 212 to determine whether the specified retention period for the derived data has elapsed. If the retention period for derived data 214 has elapsed, the derived data retention module 220 may remove the derived data 214 from the cache 212, thereby reducing the storage cost burden for the customer 202. In an embodiment, if the retention period for derived data 214 stored in the cache 212 has not elapsed and the customer 202 submits a request to obtain the derived data 214, the derived data retention module 220 resets the retention period for the derived data 214 such that the derived data 214 may be retained for a longer period of time within the cache 212 and, thus, enables the customer 202 to access the derived data 214 without need for the request processing sub-system 206 to regenerate the derived data 214. Alternatively, the retention period for derived data 214 may be fixed. Thus, even if the customer 202 submits a request to obtain the derived data 214 during the retention period of the derived data 214 within the cache 212, the retention period may continue to toll, as the derived data storage module 220 may not reset the retention period for the derived data 214. Thus, once the retention period for the derived data 214 has elapsed, the derived data retention module 220 may remove the derived data 214 from the cache 212.

Figure 3:
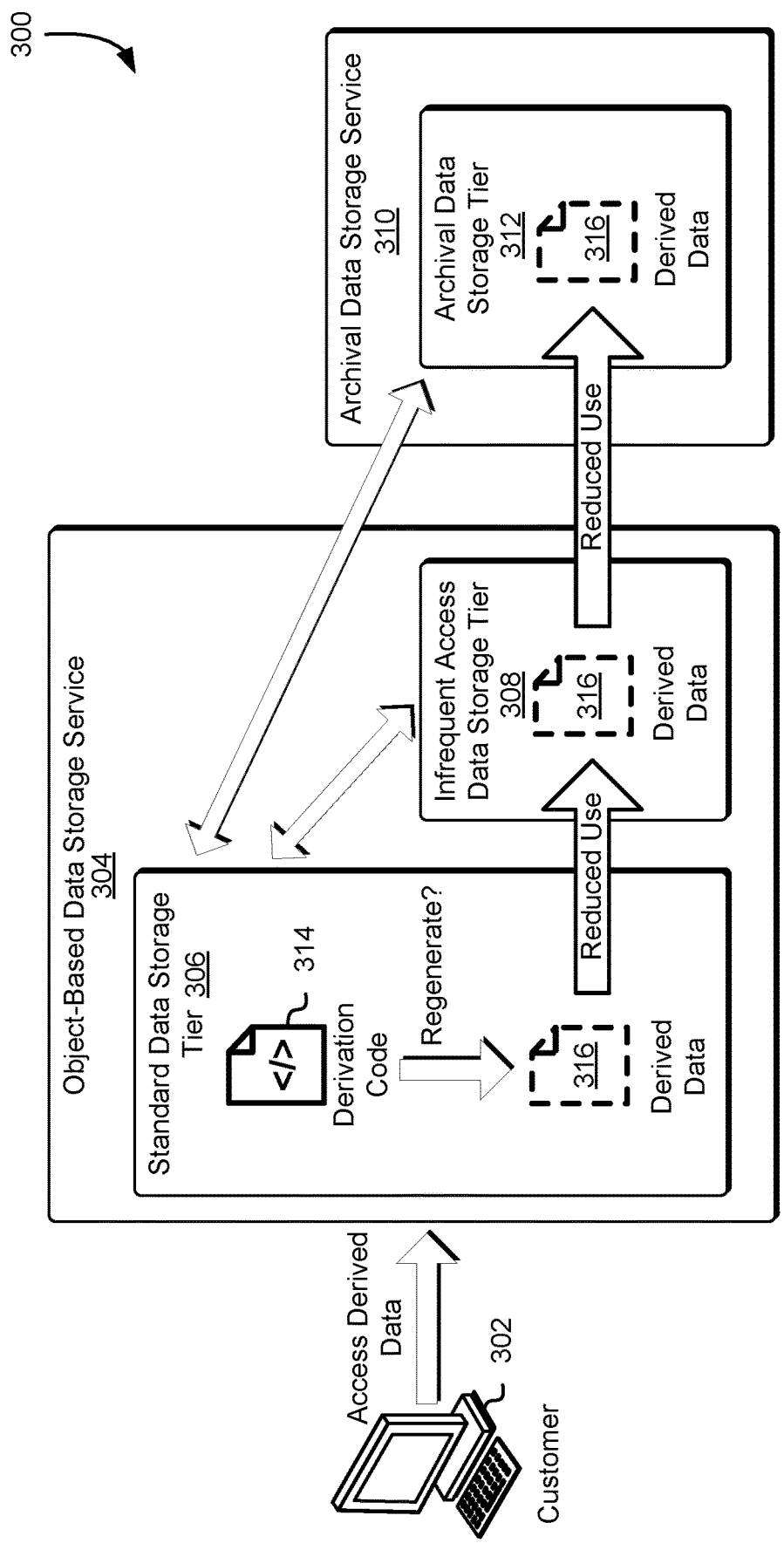
FIG. 3 shows an illustrative example of a system in which derived data is migrated from a standard data storage tier to different data storage tiers based on usage of the derived data in accordance with at least one embodiment.

As noted above, the object-based data storage service may store derived data within the logical data container utilized to store the derivation code and data usable to generate the derived data. Thus, the derived data may initially be stored in a logical data container of the same data storage tier of the derivation code and data. The object-based data storage service may monitor usage of the derived data to determine whether to transition the derived data to another data storage tier. In some instances, if the derived data is transitioned to another data storage tier, making it more difficult or time-intensive to obtain the derived data, the object-based data storage tier may regenerate the derived data based on the urgency of the customer to obtain the derived data. Accordingly, FIG. 3 shows an illustrative example of a system 300 in which derived data 316 is migrated from a standard data storage tier 306 to different data storage tiers based on usage of the derived data 316 in accordance with at least one embodiment.

In the system 300, a customer 302 of the object-based data storage service 304 submits a request to access derived data 316 that may be generated through execution of derivation code 314 stored within a logical data container of the object-based data storage service 304. As illustrated in FIG. 3, the derivation code 314 is stored in a logical data container classified as being in a standard data storage tier 306. In an embodiment, the object-based data storage service 304 provides different data storage tiers for different data object use cases. These different data storage tiers may provide benefits to the customer 302 and other users based at least in part on the usage of data objects classified accordingly. For example, as illustrated in FIG. 3, the object-based data storage service 304 provides a standard data storage tier 306, which can be utilized to classify data objects that are to be accessed frequently by the customer 302 and other users (e.g., data utilized for dynamic websites, content distribution, mobile and gaming applications, analytics, etc.). Data objects classified as being in the standard data storage tier 306 may be stored on computer systems that enable rapid availability with minimal latency. Thus, in some instances, the object-based data storage service 304 may provide cost savings to the customer 302 by enabling frequently used data objects classified as being in the standard data storage tier 306 to be accessed without incurrence of a fee per data access.

The object-based data storage service 304 may also provide an infrequent access data storage tier 308, which may be utilized to classify data objects that are accessed at a lesser frequency than other data objects classified as being in the standard data storage tier 306. Data objects classified in the infrequent data storage access tier 306 may be stored on computer systems that enable rapid availability with minimal latency but at a lower cost than that of the standard data storage tier 304. However, each request to access a data object classified as being in the infrequent access data storage tier 306 may be subject to a fee. Thus, if a data object is utilized at a low rate, it may be more cost-effective for the data object to be classified as being in the infrequent access data storage tier 306, as the savings resulting from the reduced cost of storage may outweigh the expense of accessing the data object at the low rate. It should be noted that while the standard data storage tier 306 and the infrequent access data storage tier 308 are used throughout the present disclosure for the purpose of illustration, additional and/or alternative data storage tiers may be utilized for the management of data objects by the object-based data storage service 304. For instance, data objects may be classified as being in a smart data storage tier, which may result in monitoring of these data objects to determine an optimal storage location for these data objects.

The archival data storage service 310 may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein. The archival data storage service 310 may provide storage for data archiving and backup of customer data. The archival data storage service 310 may thus persistently store data that may be infrequently accessed and for which long retrieval times are acceptable to a customer 302 utilizing the service. A customer 302 or the object-based data storage service 304 may interact with the archival data storage service 310 to generate one or more archives. Each archive may represent one or more data files that may be combined to form the archive. Accordingly, a customer 302 or the object-based data storage service 304, through API calls to the service, may upload and retrieve archives from the archival data storage service 310 and monitor the retrieval of these archives, as each retrieval job may typically require several hours to complete.

In an embodiment, access to the derived data 316 is monitored by the object-based data storage service 304 to determine an optimal placement of the derived data 316 over time. For instance, usage of the derived data 316 may be recorded in a data log, which may specify the time at which the derived data 316 was accessed and the duration of such access. The object-based data storage service 304 may evaluate this data log to identify a frequency over time that the derived data 316 is utilized by the customer 302 and other authorized users. In some instances, the object-based data storage service 304 may compare this usage frequency of the derived data 316 to the usage frequency of other data objects classified as being in the same data storage tier. If the usage frequency of the derived data 316 is lower than the average usage frequency for other data objects classified as being in the same data storage tier, the object-based data storage service 304 may transition the derived data 316 to a logical data container corresponding to another data storage tier. For example, if the derived data 316 is classified as being in the standard data storage tier 306, the object-based data storage service 304 may transfer the derived data 316 to a logical data container classified as being in the infrequent access data storage tier 308 or to the archival data storage tier 312.

The request from the customer 302 may specify an identifier corresponding to the derived data 316 that may be generated through execution of the derivation code 314. Additionally, the request from the customer 302 may specify an indication of the urgency of the customer 302 to obtain the derived data 316. For instance, a customer 302 may specify that the derived data 316 is required for time sensitive purposes or as input to other functions that require use of the derived data 316 in a time sensitive manner. If the request from the customer 302 does not specify a particular time limitation for obtaining the derived data 316, the object-based data storage service 304 may identify the location of the derived data 316. In an embodiment, if the derived data 316 is no longer stored in any location associated with the object-based data storage service 304 (e.g., any of the different data storage tiers), the object-based data storage service 304 executes the derivation code 314 to regenerate the derived data 316. The object-based data storage service 304 may provide the regenerated derived data 316 to the customer 302 to fulfill the request. Further, the object-based data storage service 304 may store the regenerated derived data 316 in a logical data container classified as being in the standard data storage tier 306 or in another data storage tier that includes the derivation code 314.

In an embodiment, if the object-based data storage service 304 determines that the impact of obtaining the derived data 316 from the data storage tier that the derived data 316 is stored in is greater than the impact of regenerating the derived data 316, the object-based data storage service 304 can regenerate the derived data 316 using the derivation code 314 and data usable to obtain the derived data 316. For example, if retrieving the derived data 316 from its data storage tier would either result in a greater cost to the customer 302 to access the derived data 316 and/or would take a significant amount of time to retrieve the derived data 316, the object-based data storage service 304 may transmit a notification to the customer 302 to indicate that retrieval of the derived data 316 may have a greater impact (e.g., incur additional cost and/or time to complete) than the impact (e.g., cost and/or time) to the customer 302 in regenerating the derived data 316. In response to this notification, the customer 302 may indicate whether it would prefer to obtain the derived data 316 from its current data storage tier or to regenerate the derived data 316 using the derivation code 314. If the customer 302 indicates that the object-based data storage service 304 may obtain the derived data 316 from any data storage tier, the object-based data storage service 304 may identify the location of the derived data 316 and obtain the derived data 316. The object-based data storage service 304 may provide the derived data 316 to the customer 302 to fulfill the request.

If the customer 302 indicates that it prefers that the derived data 316 be regenerated in order to obtain the derived data 316 in less time and/or to incur less storage and access related costs, the object-based data storage service 304 may execute the derivation code 314 to regenerate the derived data 316. The object-based data storage service 304 may provide the regenerated derived data 316 to the customer 302 to fulfill the request. Further, since the derived data 316 is stored within a logical data container or archive, the object-based data storage service 304 may remove the regenerated derived data once it has been provided to the customer 302. This may prevent duplicative storage of the derived data 316. In an embodiment, the object-based data storage service 304 updates usage data for the derived data 316 to indicate that the customer 302 requested access to the derived data 316 and that the derived data 316 was regenerated in response to the request from the customer 302. The usage data may be utilized by the object-based data storage service 304 to determine an optimal data storage tier for the derived data 316.

In an embodiment, the object-based data storage service 304 evaluates the size of the derived data 316 and the size of the data usable as input to the derivation code 314 to determine whether the derived data 316 or the data usable as input to the derivation code 314 is to be subject to transitioning to other data storage tiers. For instance, if the size of the derived data 316 is less than the size of the data usable as input to the derivation code 314, the object-based data storage service 304 may monitor usage data of the data usable as input to the derivation code 314 to determine whether it is to be transitioned to another data storage tier. The derived data 316 may thus be retained within the data storage tier of the derivation code 314, either subject to storage in the cache (as described above) or without restriction within the data storage tier of the derivation code 314.

In an embodiment, the derived data 316 is stored and maintained in a storage location associated with a distinct data storage tier than the data storage tiers described above and illustrated in FIG. 3. This distinct data storage tier may be maintained solely for derived data of customers of the object-based data storage service. The distinct data storage tier may be subject to different reliability and redundancy standards than the other data storage tiers of the object-based data storage service. Since this distinct data storage tier may have different reliability and redundancy standards than the other data storage tiers, the derived data 316 may be stored in a manner that would result in lower costs to the customer 302. Further, since the derived data 316 may be regenerated using the derivation code 314 and data usable as input to the derivation code 314, loss of the derived data 316 in this distinct data storage tier may result in minimal or no impact to the customer 302 for obtaining the derived data 316.

Figure 4:
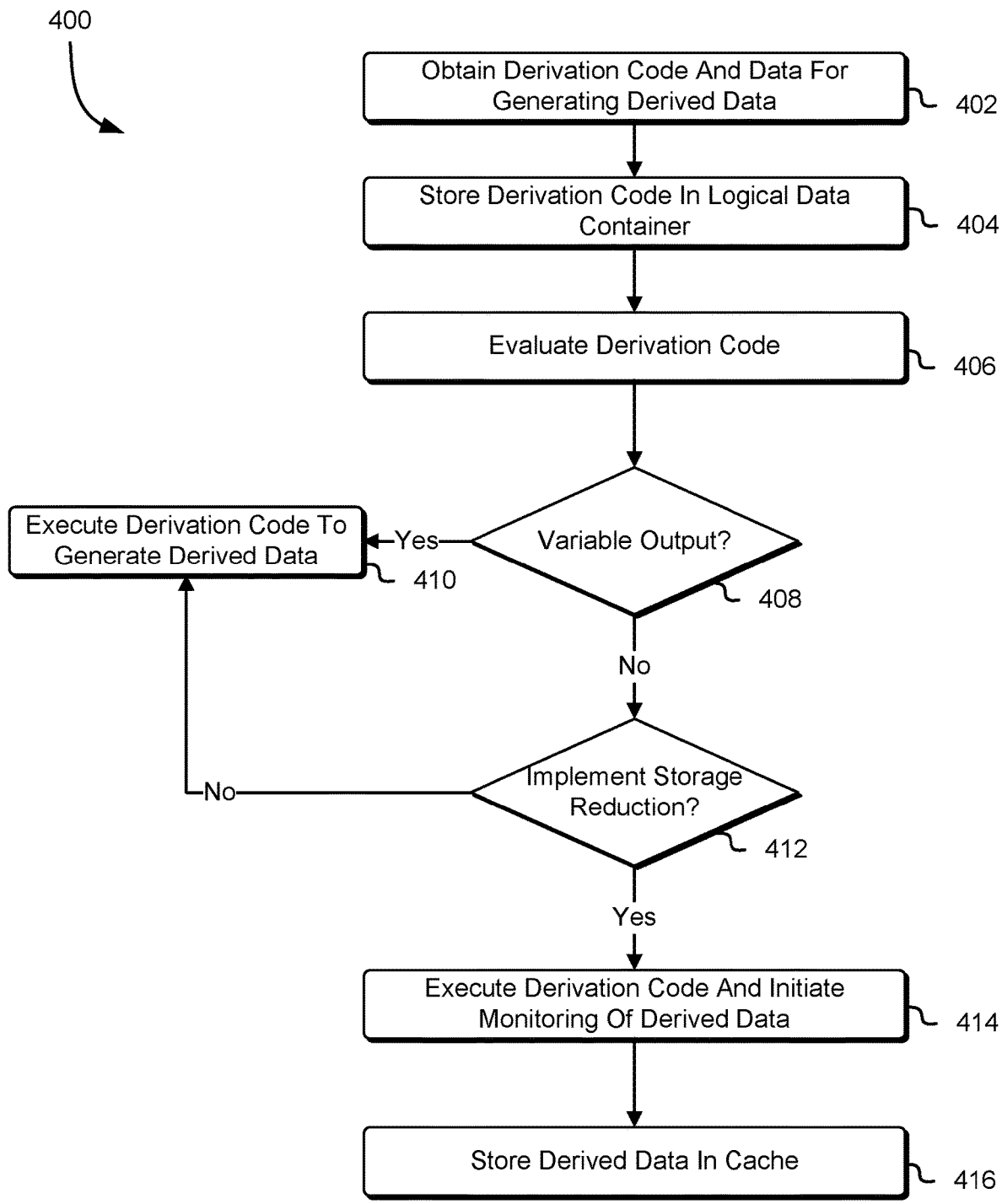
FIG. 4 shows an illustrative example of a process for generating derived data using derivation code and data stored within a logical data container and storing the derived data in a cache in accordance with at least one embodiment.

As noted above, a customer of the object-based data storage service may provide data and derivation code that, if executed by the object-based data storage service, may produce derived data. The object-based data storage service may evaluate the derivation code to determine whether using the data as input to the derivation code will result in generation of identical derived data each time the derivation code is executed. If so, the object-based data storage service may store the derived data in a cache, where the derived data may remain until a retention period for the derived data has elapsed. Accordingly, FIG. 4 shows an illustrative example of a process 400 for generating derived data using derivation code and data stored within a logical data container and storing the derived data in a cache in accordance with at least one embodiment. The process 400 may be performed by the object-based data storage service, which may obtain and evaluate the derivation code from the customer and manage derived data generated via execution of the derivation code.

At any time, the object-based data storage service may receive a request from a customer to store derivation code and other data usable as input to the derivation code within a logical data container of the customer. In an embodiment, the object-based data storage service provides different data storage tiers for different data object use cases. These different data storage tiers may provide benefits to the customer and other users based at least in part on the usage of data objects classified accordingly. The request may specify a desired classification for the derivation code and other data, such as a classification corresponding to the standard data storage tier or to the infrequent access data storage tier, as described above. The request may alternatively specify an identifier corresponding to the logical data container in which the derivation code and other data is to be stored. The object-based data storage service may obtain 402 the derivation code and other data for generating derived data from the customer.

In response to the request, the object-based data storage service may store 404 the derivation code and other data in a logical data container. For instance, if the request specifies an identifier corresponding to a logical data container of the customer, the object-based data storage service may store the derivation code and the other data in the identified logical data container to fulfill the request. Alternatively, if the customer has not previously provisioned a logical data container, but the request specifies a preferred data storage tier for the logical data container, the object-based data storage service may generate a new logical data container for storage of the derivation code and other data. Further, the object-based data storage service may classify the logical data container as being of the preferred data storage tier identified by the customer in its request to the object-based data storage service.

In an embodiment, the object-based data storage service evaluates 406 the derivation code to determine 408 whether the derived data generated via execution of the derivation code comprises variable output (e.g., the derived data differs for each execution of the derivation code). For instance, the object-based data storage service may evaluate the derivation code to identify any programmatic instructions that require a variable input, such as the current system time/date, current system metrics data, and the like. Derivation code that requires variable input may result in creation of derived data that may differ based on any number of variables, resulting in derived data that may not be consistent for each execution of the derivation code. In an embodiment, if the object-based data storage service determines that execution of the derivation code would result in creation of derived data with variable output, the object-based data storage service may execute 410 the derivation code and store the derived data generated through execution of the derivation code in the logical data container with the data and the derivation code.

If the object-based data storage service determines, based on evaluation of the derivation code, that execution of the derivation code would result in identical derived data each time the derivation code is executed, the object-based data storage service may determine 412 whether to implement storage reduction processes for the logical data container. For instance, in the request to store the derivation code and the other data, the customer may indicate that any derived data generated using the derivation code is to be maintained in the logical data container along with the derivation code and other data. Alternatively, the customer may specify, in its request to the object-based data storage service, that the object-based data storage service is to reduce the cost burden to the customer with regard to storage of data within the logical data container. If the customer has specified that any derived data generated using the derivation code is to be maintained in the logical data container with the derivation code and other data, the object-based data storage service may execute 410 the derivation code to generate the derived data and store the derived data in the logical data container.

If the object-based data storage service determines, based on the customer's request, that it is to implement storage reduction processes for the logical data container, the object-based data storage service may execute 414 the source code and initiate monitoring of the derived data. Further, the object-based data storage service may temporarily store 416 the derived data in a cache of the logical data container. The object-based data storage service may store the derived data in the cache in accordance with a set of storage parameters (e.g., customer's budget for storage of data, statistics of cost to recreate the derived data versus the cost to store in the cache over time, etc.). Through use of the set of storage parameters, the object-based data storage service determines the retention period for the derived data in the cache. For instance, if the derived data is not accessed during the retention period, the object-based data storage service may remove the derived data from the cache. In some instances, requests to access the derived data may reset the retention period for storage of the derived data within the cache. Alternatively, the retention period may be fixed, resulting in removal of the derived code from the cache once the retention period has elapsed regardless of whether the customer has requested access to the derived data.

Figure 5:
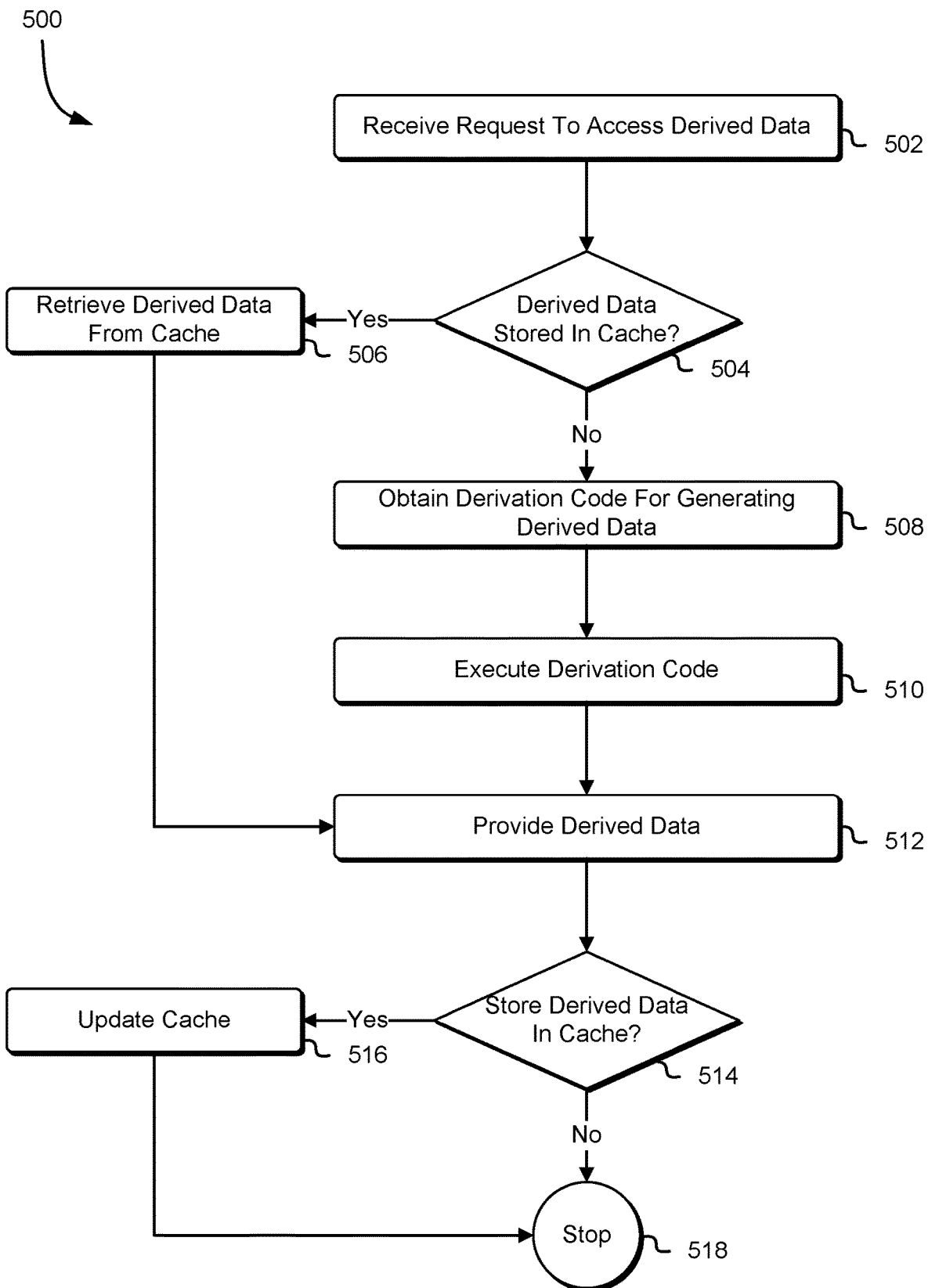
FIG. 5 shows an illustrative example of a process for providing, in response to a request to obtain derived data, the derived data generated using derivation code and data in accordance with at least one embodiment.

As noted above, the object-based data storage service may remove derived data from a cache once the retention period for the derived data has elapsed. If a customer submits a request to obtain the derived data, and the derived data is no longer being stored in the cache, the object-based data storage service may regenerate the derived data using the derivation code. Accordingly, FIG. 5 shows an illustrative example of a process 500 for providing, in response to a request to obtain derived data, the derived data generated using derivation code and data in accordance with at least one embodiment. The process 500 may be performed by the aforementioned object-based data storage service, which may process incoming requests from customers to obtain derived data generated using derivation code stored in a logical data container.

At any time, the object-based data storage service may receive 502 a request from a customer or other user to access derived data generated using particular derivation code stored in a logical data container. The request may specify an identifier corresponding to the derivation code and an identifier corresponding to the data to be utilized as input to the derivation code to generate the derived data. In an embodiment, the object-based data storage service maintains an association between the derived code and the data usable as input to the derivation code to generate the derived data. For instance, the object-based data storage service may maintain a database that includes an entry corresponding to the derivation code and, within the entry, identifiers corresponding to the data usable as input to the derivation code. The entry may specify, for each derivation code and data pairing, whether the derived data generated through execution of the derivation code results in a consistent or variable output. Within the database, the object-based data storage service may generate a unique identifier for each possible set of derived data that may be generated through execution of the derivation code. For instance, for each pairing of derivation code and data usable as input, the object-based data storage service may generate a unique identifier for the resulting derived data. The object-based data storage service may provide these unique identifiers corresponding to possible derived data to the customer. Thus, the customer may submit a request to obtain the derived data, where the request specifies a unique identifier corresponding to the derived data.

In response to the request, the object-based data storage service may determine 504 whether the derived data is stored within a cache of the logical data container. As noted above, the derived data may be stored in the cache subject to a limited retention period. Thus, if the retention period for the derived data has elapsed, the derived data may be removed from the cache. If the object-based data storage service determines that the derived data is stored within the cache, the object-based data storage service may retrieve 506 the derived data from the cache for delivery to the customer in response to the customer's request.

If the derived data is no longer stored in the cache, the object-based data storage service may obtain 508 the derivation code for generating the derived data from the logical data container. For instance, if the request from the customer specifies an identifier corresponding to the derived data, the object-based data storage service may use the identifier corresponding to the derived data to query a database to identify an entry that includes the identifier. The database may include an entry corresponding to each derivation code stored by the object-based data storage service for generation of derived data. Thus, the database may include an entry that specifies an association between a particular derivation code and the identifier of the derived data. The object-based data storage service may utilize this entry to identify the corresponding derivation code that, if executed by the object-based data storage service, would result in generation of the derived data. The object-based data storage service may obtain and execute 510 the derivation code to obtain the derived data.

The object-based data storage service may provide 512 the derived data to the customer to fulfill the customer's request to access the derived data. In an embodiment, the object-based data storage service determines 514 whether to store the derived data in the cache of the logical data container. For instance, if the customer indicates in its request that the derived data is to be maintained in the logical data container along with the derivation code and other data, the object-based data storage service may store the derived data in the logical data container instead of the cache. Thus, the derived data may not be subject to a retention period after which the derived data can be removed from the cache. If the derived data is to be stored in a location other than the cache or is to be outright deleted after being provided to the customer, the object-based data storage service may do so and terminate 518 the process 500.

In an embodiment, if the object-based data storage service determines that the derived data is to be stored within the cache, the object-based data storage service may update 516 the cache to store the derived data. For instance, if the derived data was originally retrieved from the cache, the object-based data storage service may reset the retention period for the derived data such that the derived data may be stored within the cache for a greater period of time so long as the customer continues to request access to the derived data. Alternatively, if the derived data is generated using the derivation code in response to the customer's request to access the derived data, the object-based data storage service may store the newly generated derived data in the cache. Further, the object-based data storage service may determine the retention period for the derived data. For instance, the object-based data storage service may define the retention period for the derived data in a cache in accordance with a set of storage parameters (e.g., customer's budget for storage of data, statistics of cost to recreate the derived data versus the cost to store in the cache over time, etc.). Once the object-based data storage service has updated the cache to store the derived data, the object-based data storage service may terminate 518 the process 500.

Figure 6:
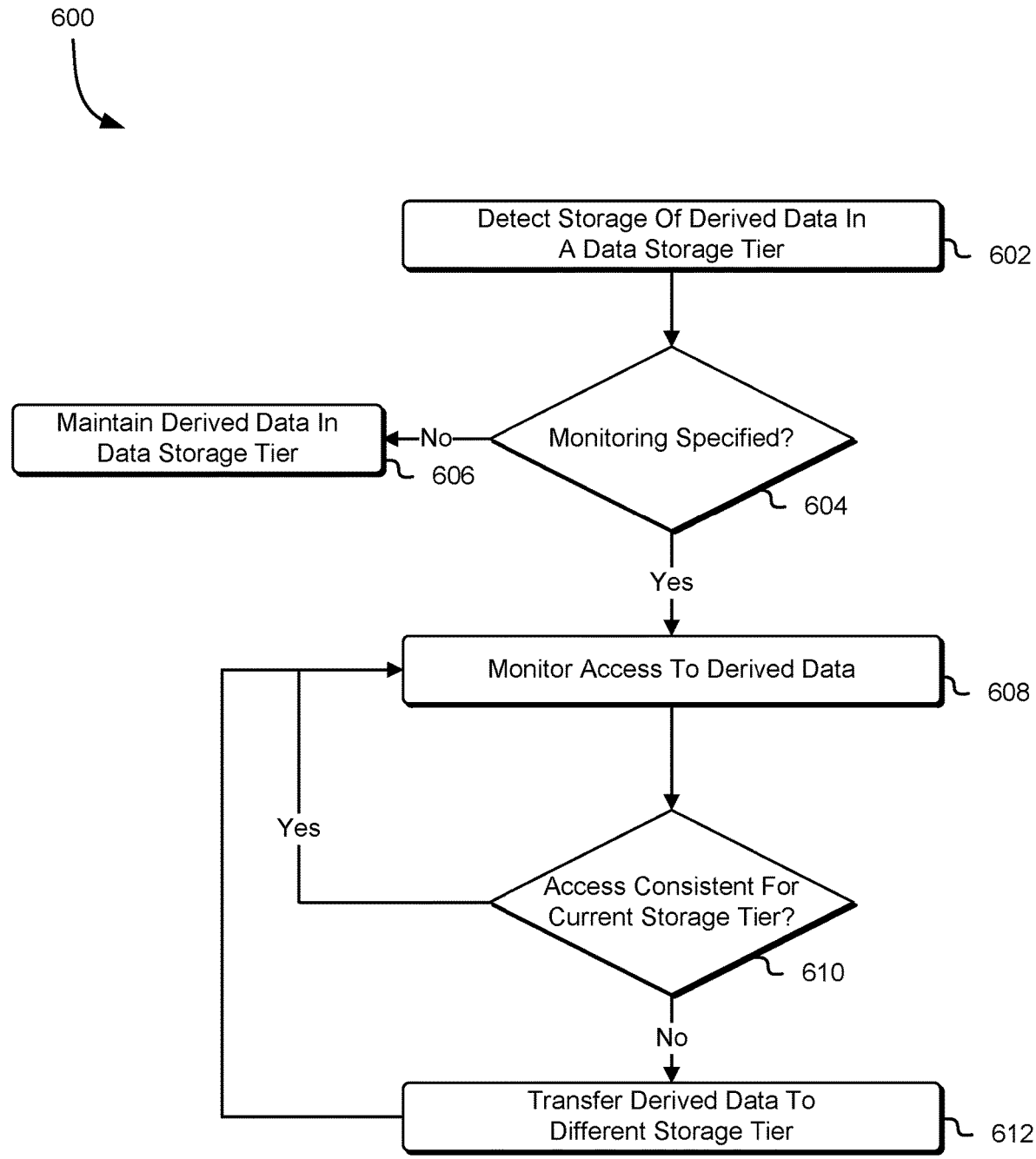
FIG. 6 shows an illustrative example of a process for monitoring access to derived data stored within a data storage tier to determine whether to transfer the derived data to a different data storage tier in accordance with at least one embodiment.

As noted above, the derived data may initially be stored in a logical data container of the same data storage tier of the derivation code and data. The object-based data storage service may monitor usage of the derived data to determine whether to transition the derived data to another data storage tier. For instance, if the derived data is utilized at a frequency below the frequency of use for other data stored in logical data containers classified as being in a particular data storage tier, the object-based data storage service may transfer the derived data to a logical data container classified as being in a different data storage tier. This different data storage tier may result in fewer storage costs for the customer but the customer may incur a fee for accessing the derived data. In some instances, the different data storage tier may result in retrieval of the derived data taking significantly more time, which may result in additional storage cost savings for the customer. Accordingly, FIG. 6 shows an illustrative example of a process 600 for monitoring access to derived data stored within a data storage tier to determine whether to transfer the derived data to a different data storage tier in accordance with at least one embodiment. The process 600 may be performed by the aforementioned object-based data storage service, which may monitor access to the derived data to determine whether transfer of the derived data to another data storage tier is to be performed to reduce the storage costs for the customer.

The object-based data storage service, at any time, may receive a request from a customer to generate derived data using derivation code stored in a logical data container of the customer. As noted above, the object-based data storage service may provide different data storage tiers for different data object use cases. These different data storage tiers may provide benefits to the customer and other users based at least in part on the usage of data objects classified accordingly. For example, the object-based data storage service may provide a standard data storage tier, which can be utilized to classify data objects that are to be accessed frequently by the customer and other users. Data objects classified as being in the standard data storage tier may be stored on computer systems that enable rapid availability with minimal latency. The object-based data storage service may also provide an infrequent access data storage tier, which may be utilized to classify data objects that are accessed at a lesser frequency than other data objects classified as being in the standard data storage tier.

In an embodiment, the object-based data storage service detects 602 storage of derived data in a logical data container classified as being in a particular data storage tier. Storage of the derived data may be performed using the logical data container that also maintains the derivation code and data usable as input to the derivation code to generate the derived data. Alternatively, a customer may specify that the derived data is to be stored in a logical data container corresponding to a different data storage tier. If the object-based data storage detects that derived data has been generated and has been stored in a logical data container corresponding to a particular data storage tier, the object-based data storage service may determine 604 whether monitoring of the derived data has been specified. For instance, a request to store derived data generated using derivation code may specify a particular data storage tier for storage of the derived data. Further, the customer may specify whether the object-based data storage service may monitor usage of this derived data and whether the object-based data storage service may automatically transition the derived data between the various data storage tiers and/or an archival data storage service.

If the customer has specified that the object-based data storage service is not to monitor usage of the derived data, the object-based data storage service may maintain 606 the derived data in the data storage tier in which the derived data is stored. Thus, regardless of any variation in usage, the derived data may remain in its original data storage tier. However, if the customer has indicated that the object-based data storage service is to monitor usage of the derived data, the object-based data storage service may monitor 608 and record any access to the derived data in a data log corresponding to the derived data.

The object-based data storage service may analyze these data logs to identify historical access to the derived data over time. Using these data logs, the object-based data storage service may determine the frequency at which the derived data is accessed by the customer and other users. Further, in some embodiments, the object-based data storage service evaluates other data objects in the data storage tier to compare the usage frequency of these data objects to that of the derived data stored in the data storage tier. Thus, based on the data obtained through evaluation of the data logs, the object-based data storage service may determine 610 whether access to the derived data over time is consistent with the desired usage frequency for storage in the current data storage tier.

If the object-based data storage service determines that access to the derived data over time is consistent with the desired usage frequency for storage in the current data storage tier, the object-based data storage service may maintain the derived data in its current data storage tier and continue to monitor 608 further accesses to the derived data. However, if the object-based data storage service determines that usage of the derived data is inconsistent with the expected usage patterns for data objects within the data storage tier, the object-based data storage service may transfer 612 the derived data to a different data storage tier. For instance, if the derived data is stored in a standard data storage tier but the object-based data storage service determines that the derived data is being utilized at a frequency that is below a threshold for the standard data storage tier, the object-based data storage service may transfer the data object to an infrequent access data storage tier or to an archival data storage service. The object-based data storage service may further monitor 608 accesses to the derived data in its new data storage tier. This enables continuous optimization of storage for the derived data to minimize the storage costs to the customer.

Figure 7:
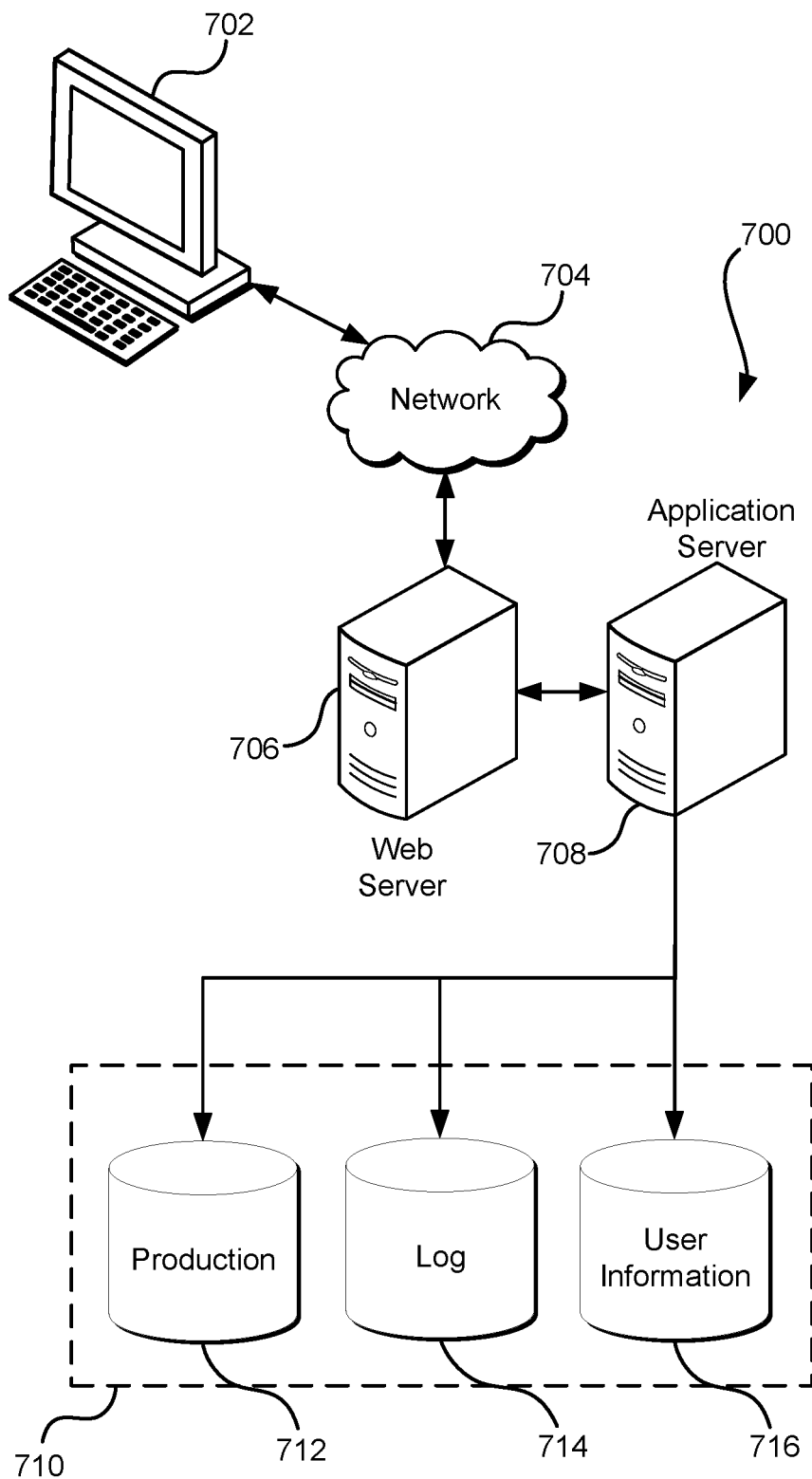
FIG. 7 shows an illustrative example of a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and a data store 710 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 710, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 712 and user information 716, which are used to serve content for the production side. The data store also is shown to include a mechanism for storing log data 714, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 710.

The data store 710, in an embodiment, is operable, through logic associated therewith, to receive instructions from the application server 708 and obtain, update or otherwise process data in response thereto and the application server 708 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

What is claimed is:

1. A computer-implemented method, comprising:
receiving an original data object for storage by an object-based data storage service;
receiving derivation code executable to generate a derived data object from the original data object, the derived data object different from the original data object, wherein the derivation code includes a set of programmatic instructions that, upon execution by one or more processors of the object-based storage service, cause the one or more processors of the object-based storage service to transform the original data object into the derived data object;
storing, at the object-based data storage service, the original data object and the derivation code, the derivation code being associated with the derived data object;
receiving, at the object-based data storage service, a request to retrieve the derived data object;
evaluating, in response to the request to retrieve the derived data object, the derivation code associated with the original data object to determine that the derivation code excludes instructions requiring inputs that change over time, wherein the same derived data is generated for each execution of the derivation code;
determining that the derived data object is unavailable to fulfill the request;
as a result of determining that the derived data object is unavailable to fulfill the request, using the derivation code to regenerate the derived data object from the original data object; and
transmitting the derived data object in response to the request.

2. The computer-implemented method of claim 1, further comprising:
evaluating the original data object to determine that using the derivation code results in the derived data object for each use of the derivation code with the original data object; and
enabling use of the derivation code to regenerate the derived data object.

3. The computer-implemented method of claim 1, further comprising:
storing the derived data object in a cache, whereby storage of the derived data object in the cache is subject to a threshold on storage in the cache;
detecting that the threshold has been met; and
as a result of the threshold having been met, removing the derived data object from the cache.

4. The computer-implemented method of claim 1, further comprising:
storing the derived data object in a first logical data container corresponding to a first data storage tier;
processing usage data associated with the derived data object to determine whether to transition the derived data object from the first logical data container to a second logical data container corresponding to a second data storage tier;
determining, based on the usage data, that the derived data object is to be transitioned to the second data storage tier; and
transitioning the derived data object to the second logical data container.

5. A system, comprising:
one or more processors; and
memory storing computer-executable instructions that, upon execution, cause the one or more processors to:
obtain an original data object and derivation code, the derivation code executable to generate a derived data object from the original data object, the derived data object being differentiated from the original data object, wherein the derivation code includes a set of programmatic instructions that, upon execution by the one or more processors, cause the one or more processors to perform a transformation on the original data object to produce the derived data object, the programmatic instructions excluding inputs related to environmental measurements;
store the original data object and the derivation code;
receive a request to retrieve the derived data object;
determine that the derived data object is unavailable; and
as a result of determining that the derived data object is unavailable, fulfill the request by:
determining that executions of the derivation code against the original data object produce the same derived data object;
using the derivation code to regenerate the derived data object from the original data object; and
transmitting the derived data object in response to the request.

6. The system of claim 5, wherein the computer-executable instructions further cause the one or more processors to:
store the derived data object in a cache;
determine, based on a set of storage parameters for storage of the derived data object, a threshold on storage of the derived data object in the cache; and
remove the derived data object from the cache if the threshold on the storage of the derived data object in the cache is met.

7. The system of claim 6, wherein:
the threshold on the storage of the derived data object is a retention period of the derived data object in the cache; and
the computer-executable instructions further cause the one or more processors to:
receive a second request to retrieve the derived data object;
obtain the derived data object from the cache;
transmit the derived data object in response to the second request; and
reset the retention period of the derived data object in response to the second request.

8. The system of claim 5, wherein the computer-executable instructions further cause the one or more processors to:
store the derived data object in a first location corresponding to a first data storage tier;
determine usage data associated with the derived data object;
determine, based on the usage data, that the derived data object is to be transitioned from the first data storage tier to a second data storage tier; and
transition the derived data object to a second location corresponding to the second data storage tier.

9. The system of claim 8, wherein the computer-executable instructions further cause the one or more processors to:
receive a second request to retrieve the derived data object;
determine that a first impact to retrieve the derived data object from the second location is greater than a second impact to regenerate the derived data object;

as a result of the first impact being greater than the second impact, use the derivation code to regenerate the derived data object from the original data object; and fulfill the second request by providing the derived data object.

10. The system of claim 5, wherein the computer-executable instructions further cause the one or more processors to:

evaluate the original data object to determine whether execution of the derivation code against the original data object results in the derived data object for each execution of the derivation code; and enable regeneration of the derived data object using the derivation code as a result of a determination that the execution of the derivation code against the original data object results in the derived data object for each execution of the derivation code.

11. The system of claim 5, wherein:

the request to retrieve the derived data object specifies an identifier corresponding to the derived data object; and the computer-executable instructions further cause the one or more processors to evaluate the identifier corresponding to the derived data object to identify the derivation code and the original data object.

12. The system of claim 5, wherein the computer-executable instructions further cause the one or more processors to:

obtain a second data object and second derivation code, the second derivation code executable to generate a second derived data object from the second data object;

determine that execution of the second derivation code against the second data object results in different derived data object for each execution of the second derivation code; and store the second derived data object with the second data object and the second derivation code.

13. A non-transitory computer-readable storage medium storing thereon executable instructions that, as a result of being executed by one or more processors of a computer system, cause the computer system to at least:

determine whether a first data object identified in a request is available to fulfill the request, the first data object associated with a derivation code associated with a second data object stored in a storage location of an object-based data storage service, the first data object distinct from the second data object, wherein the associated derivation code includes a set of programmatic instructions that, upon execution by the one or more processors, cause the one or more processors to produce the first data object by transforming the second data object, the programmatic instructions excluding inputs that change over time, wherein executions of the set of programmatic instructions against the second data object produce the same first data object; and as a result of determining that the first data object is unavailable to fulfill the request;

obtain the associated derivation code and the second data object from the storage location;

execute the associated derivation code to generate the first data object from the second data object; and transmit the first data object to be used in a response to the request.

14. The non-transitory computer-readable storage medium of claim 13, wherein the instructions further cause the computer system to:

store the first data object in a cache;

determine a threshold for storage of the first data object in the cache;

detect that the threshold has been met; and remove the first data object from the cache as a result of detecting that the threshold has been met.

15. The non-transitory computer-readable storage medium of claim 14, wherein the threshold is a retention period for the storage of the first data object.

16. The non-transitory computer-readable storage medium of claim 13, wherein:

the request specifies an identifier unique to the first data object; and the instructions further cause the computer system to utilize the identifier to obtain the derivation code and the second data object.

17. The non-transitory computer-readable storage medium of claim 13, wherein the instructions further cause the computer system to:

store the first data object in a first location corresponding to a first data storage tier;

monitor access to the first data object to determine usage data associated with the first data object;

determine, based on the usage data, that the first data object is to be transitioned to a second data storage tier; and transition the first data object to a second location corresponding to the second data storage tier.

18. The non-transitory computer-readable storage medium of claim 17, wherein the instructions further cause the computer system to:

obtain a second request to obtain the first data object;

determine that the first data object is stored in the second location corresponding to the second data storage tier;

determine that a first cost associated with retrieval of the first data object from the second location is greater than a second cost to regenerate the first data object;

as a result of the first cost being greater than the second cost, utilize the derivation code and the second data object to regenerate the first data object, resulting in regenerated first data object;

transmit the regenerated first data object to fulfill the second request; and remove the regenerated first data object.

19. The non-transitory computer-readable storage medium of claim 13, wherein the instructions further cause the computer system to:

evaluate the derivation code to determine whether execution of the derivation code against the second data object results in the first data object for each execution of the derivation code; and as a result of determining that execution of the derivation code against the second data object results in the first data object, enable use of the derivation code to regenerate the first data object.

20. The non-transitory computer-readable storage medium of claim 13, wherein the instructions further cause the computer system to:

receive a second request to store second derivation code, the second derivation code associated with the second data object;

evaluate the second data object to determine whether execution of the second derivation code against the second data object results in an identical derived data object for each execution of the second derivation code against the second data object; and as a result of determining that for each execution of the second derivation code with the second data object results in a different derived data object being generated, store a derived data object generated as a result of execution of the second derivation code with the second data object with the second derivation code.

22. The computer-implemented method of claim 1, wherein the original data object is:
an image file,
an audio file, or
a video file.

22. The system of claim 5, wherein the derived data object is:
a transcoded image,
a transcoded audio file, or
a transcoded video.

23. The computer-implemented method of claim 1, wherein the derived data object remains consistent across executions of the derivation code.

* * * * *